United States Patent [19]

Wojtowicz

[11] 3,813,953

[45] June 4, 1974

[54] LINEAR TO LINEAR MOTION APPARATUS INCLUDING A BIDIRECTIONAL SPRING CLUTCH HAVING MEANS TO INHIBIT AUTOMATIC SHIFTING

[75] Inventor: Edward A. Wojtowicz, Bryn Mawr, Pa.

[73] Assignee: Burroughs Corporation, Detroit, Mich.

[22] Filed: Dec. 27, 1972

[21] Appl. No.: 319,091

[52] U.S. Cl. .................. 74/89.17, 74/29, 192/41 S
[51] Int. Cl. ............................................ F16h 27/02
[58] Field of Search ............. 74/89.17, 29; 192/41 S

[56] References Cited
UNITED STATES PATENTS

| | | | |
|---|---|---|---|
| 1,704,062 | 3/1929 | Starkey | 192/41 S |
| 2,857,697 | 10/1958 | Schutt et al. | 74/89.17 |
| 2,885,896 | 5/1959 | Hungerford et al. | 192/41 S |
| 3,429,195 | 2/1969 | Bassoff | 74/29 |
| 3,475,973 | 11/1969 | Blazek et al. | 74/29 |
| 3,668,941 | 6/1972 | Canner | 74/89.17 |
| 3,670,861 | 6/1972 | Zenner et al. | 192/41 S |

*Primary Examiner*—Samuel Scott
*Assistant Examiner*—Wesley S. Ratliff, Jr.
*Attorney, Agent, or Firm*—Charles S. Hall; Edward G. Fiorito; Paul W. Fish

[57] ABSTRACT

A linear to linear motion apparatus utilizing an output member slidably mounted on a shaft with an input member of circular cross section journalled therein, an elongated rack running through the output member parallel to the shaft and geared to the input member, and a bidirectional spring clutch controlling the relative motion of the input and output members. The clutch comprises a pair of left-hand wound helical springs, oppositely coiled on respective aligned surfaces of the input and output members, controlled by a shifter sleeve, and a third helical spring coiled on the shifter sleeve and an adjoining surface of the output member for inhibiting the automatic shifting of the sleeve. The rack can be run through the output member unidirectionally in either direction, or locked to the output member for advancing it unidirectionally in either direction, as determined by the state of the clutch.

10 Claims, 4 Drawing Figures

LINEAR TO LINEAR MOTION APPARATUS INCLUDING A BIDIRECTIONAL SPRING CLUTCH HAVING MEANS TO INHIBIT AUTOMATIC SHIFTING

BACKGROUND OF THE INVENTION

This invention relates to linear to linear motion devices, and more particularly to such devices incorporating a bidirectional spring clutch and including a device for inhibiting automatic reversal of the clutch.

In the automatic processing of mail a "batch" of mail is gradually accumulated at one position and then advanced to another position position for further processing. In one apparatus for handling such batches of mail a housing is slidably mounted on a shaft and mail accumulates between a backing plate and a pivotable forward gate, the pressure of accumulating mail against the forward gate serving to advance the housing along the shaft. When a batch of mail is accumulated between the backing plate and the gate, the backing plate is advanced, forcing the housing and the batch of mail forward to the next position. Upon arrival at the next processing point, the gate is pivoted upwardly and the batch of mail discharged. The housing, gate and backing plate are then restored to their original positions.

In the automation of such equipment complex linear relationships arise. During the accumulation of the batch of mail the gate and housing must move linearly and freely with respect to the backing plate. After the accumulation of the batch, the backing plate, forward gate and the housing must move linearly together. Upon arrival at the next processing station and the pivoting of the gate, the backing plate must move linearly with respect to the housing and the forward gate to eject the batch of mail. All these linear moves are in the same direction.

After the ejection of the mail the housing, the gate and the backing plate must be moved linearly in the opposite direction and the backing plate may be moved farther linearly, with respect to the housing and gate, to return all the elements of their original positions.

If any controls are mechanically sequenced during the unidirectional forward motion, the effect of the reversal of the controls during the unidirectional return motion must be timed to permit all elements to return to their original positions, including the closing of the gate.

BRIEF STATEMENT OF THE INVENTION

It is, therefore, an object of this invention to provide a simple and compact linear to linear motion apparatus for unidirectional movement in either direction, and wherein either of two elements can move freely with respect to the other or be locked together for unitary movement in either direction, according to the setting of the controls.

It is a further object of the invention to provide means to inhibit the effect of the automatic reversal of the controls of a linear to linear motion apparatus until a predetermined state of the apparatus, within a sequence of events, has been reached.

These objectives are attained by utilizing an output housing slidably mounted on a shaft, an input member of circular cross section journalled in the housing, a pair of similarly wound helical springs oppositely coiled on respective adjoining surfaces of the output housing and input member and a rack running through the housing parallel to the shaft and geared to the input member. A shifter sleeve for controlling the engagement of the springs may be biased for normal engagement of one of the springs. A third helical spring is coiled on the shifter sleeve and an adjoining surface of the output member for inhibiting the return of the shifter sleeve to its normal position under bias. When the shifter sleeve is acting under bias the housing may be advanced unidirectionally along the shaft and rack, the input member turning idly in the output member, or the rack advanced in the same direction, carrying the housing along, since the input member cannot reverse direction. Mechanical devices may shift the position of the sleeve at any given point of unidirectional advance, he inhibiting spring acting to retain the sleeve in the shifted position against bias. The reverse motion of the rack will then draw the housing linearly, and the housing can be moved linearly with respect to the rack in the same direction, until the inhibiting spring is disengaged, and the bias becomes effective to reverse the engagement of the pair of springs.

DESCRIPTION OF THE DRAWINGS

For a better understanding of these and other features and advantages of the present invention, reference is made to the following description and accompanying drawing, in which.

DETAILED DESCRIPTION OF THE PREFERRED EMBODIMENT

Figure 1:
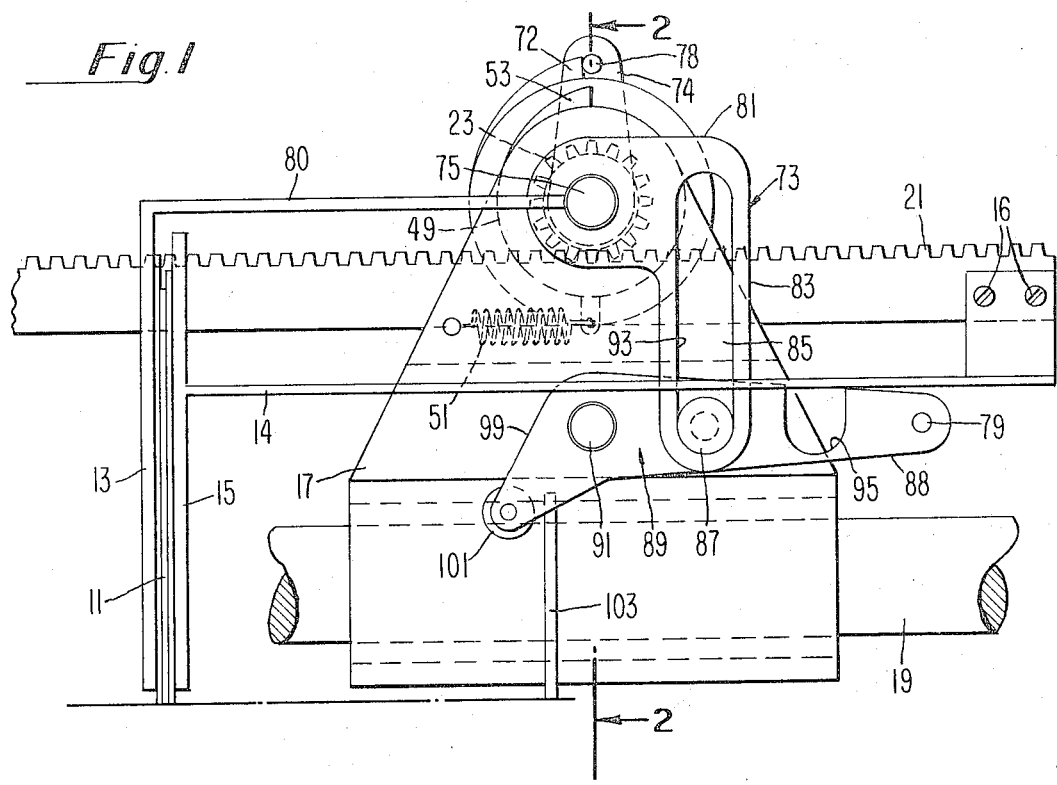
FIG. 1 is an end view of a linear to linear motion apparatus incorporating the concept of the invention.

The linear to linear motion apparatus of the invention is herein described as incorporated in mail transferring machinery (FIG. 1) for use within a Post Office. As mail 11 is sorted, for example, it accumulates between a forward gate 13 and a backing plate 15. The pressure of the accumulating mail 11 against the forward gate 13 advances a housing 17 attached to the gate 13 leftwardly along a shaft 19, as seen in FIG. 1.

The housing 17 is slidably mounted on the shaft 19 and is pierced by an elongated rack 21 to which is affixed the mail backing plate 15, as by plate 14 and bolts 16. Journalled in the housing 17 is an input drive sleeve 23 of circular cross section (FIG. 2), one end of which is geared to the rack 21. The shaft 19 and rack 21 are parallel to each other and the rack 21 runs through the housing 17 perpendicularly to the axis of rotation of the drive sleeve 23.

A collar 25, integral with and encircling the sleeve 23 intermediate its ends, fits in a channel 27 in the housing 17. The outer surface of the collar 25 is formed into a pair of shoulders 29, 31 of circular cross section separated by a ring 33. Aligned with each of the shoulders 29, 31 is a surface 35, 37 of circular cross section formed on the housing 17.

Figure 2:
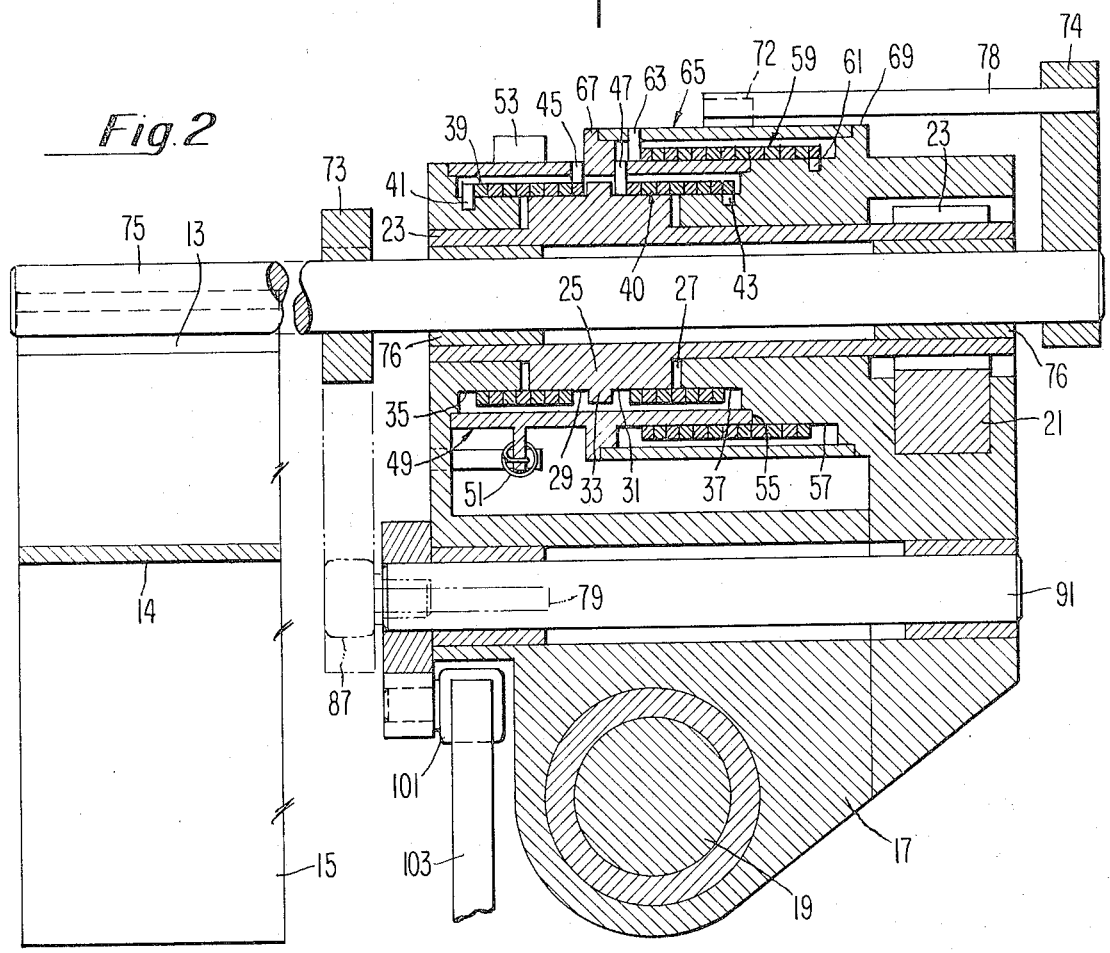
FIG. 2 is a cross section of the apparatus of the invention taken along line 2 — 2 of FIG. 1.

A left-hand wound helical spring 39 is coiled on the aligned shoulder 29 of the collar 25 on the sleeve 23 and surface 35 of the housing 17 toward the left from the ring 33, as seen in FIG. 2. Similarly, a second left-hand wound helical spring 40 is coiled on the aligned shoulder 31 on the collar 25 of the sleeve 23 and surface 37 of the housing 17 toward the right as seen in FIG. 2. A tang 41, 43 on the outer end of each of the helical drive springs 39, 40 is fixed in housing 17.

Figure 3:
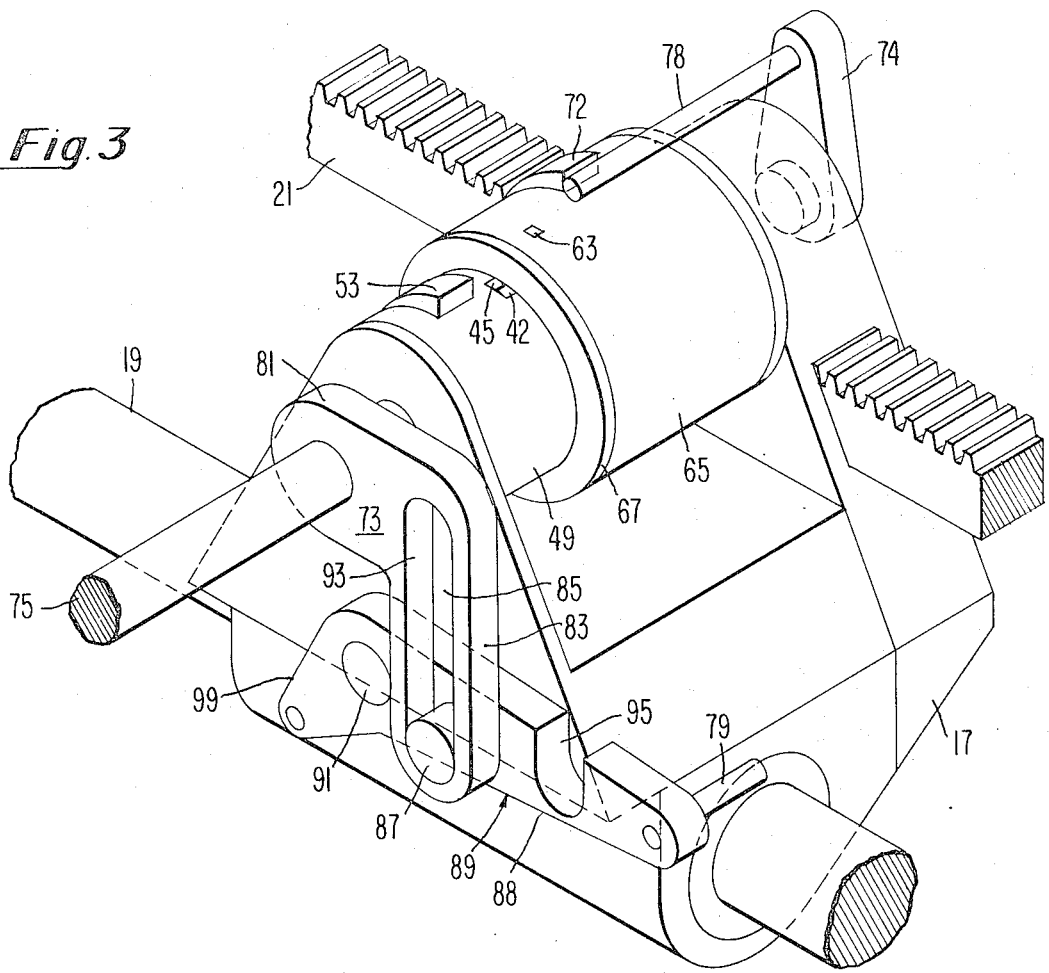
FIG. 3 is a perspective view of the apparatus of FIG. 1, partially broken away, with controls in the same mode as FIG. 1.

A tang 45, 47 on the inner end of each of the helical drive springs 39, 40, positioned adjacent the ring 33, has its outer end captured in an individual short slot 42 (only one shown — FIG. 3) in a control sleeve 49 journalled on surfaces of the housing 17. The slots 42 are so proportioned and positioned with respect to the tangs 45, 47 on the inner end of the springs 39, 40 that a predetermined, limited clockwise rotation of the sleeve 49 will disengage the spring 39 and leave the spring 40 engaged, and a predetermined limited counterclockwise rotation of the sleeve 49 will disengage the spring 40 and leave the spring 39 engaged.

The helical drive springs 39, 40 with the shifter sleeve 49 form a clutch for controlling the relative rotary motion of the sleeve 23 and housing 17, and thereby the relative linear motion of the housing 17 and the rack 21 with respect to each other and with respect to the shaft 19.

A spring 51 is connected between the control sleeve 49 and the housing 17 for biasing the control sleeve in a clockwise position, as seen in FIG. 1. In the state of the clutch wherein the control sleeve 49 is acting under clockwise bias of spring 51, the left-hand wound drive spring 39 will be disengaged and the left-hand wound drive spring 40 engaged. The drive sleeve 23 will, therefore, turn freely, or overrun, counterclockwise against the coils of the engaged spring 40, but cannot turn clockwise because of the locking action of the engaged spring.

Therefore, in the normal condition of the clutch, with the reciprocable control sleeve 49 acting under bias, the housing 17 may be advanced linearly along the shaft 19, to the left in FIG. 1, or the rack 21 retracted linearly through the housing 17, to the right in FIG. 1, in either case turning the drive sleeve 23 idly counterclockwise. However, the housing 17 cannot be retracted along the shaft 19 and rack 21 because of the braking effect of the engaged spring 40 on the sleeve 23, and the linear advancement of the rack 21 to the left will also advance the housing 17 linearly along the shaft 19.

A tab 53 is provided on control sleeve 49 for ease of rotating sleeve 49 counterclockwise against the bias of spring 51. When the control sleeve 49 is in its counterclockwise position, the drive spring 39 is engaged and the drive spring 40 disengaged. The drive sleeve 23 will, therefore, turn idly clockwise, but be braked against counterclockwise motion. Exactly the opposite linear actions may then be taken as when the control sleeve 49 is in its clockwise position, acting under bias.

Additional configurations of springs for bidirectional spring clutches are known in the art, such as a pair of right-hand wound helical springs with proper adjustment of the direction of rotation of the control sleeve and its bias. The choice of spring windings in the clutch of the invention is a matter of convenience.

The rearward side (right on FIG. 2) of the control sleeve 49 rides in a notch 55 in the housing 17 and is aligned with a surface 57 of circular cross section on the housing. A left-hand wound helical spring 59 is coiled around the rearward side of the control sleeve 49 and the surface 57 of the housing 17 and a tang 61 on the rearward end of the spring 59 is embedded in the housing.

A tang 63 on the forward end of the helical spring 59 is fixed in a second control sleeve 65 journalled on a raised ring 67 on the control sleeve 49 and a shoulder 69 on the housing 17.

The engagement of helical spring 59 prevents the control sleeve 49 from shifting from its counterclockwise to its clockwise position under the bias of spring 51. Although the control sleeve 49 may be freely shifted counterclockwise against the coils of the helical spring 59, the sleeve 49 is inhibited from returning to its clockwise position under the bias of spring 51 by the braking effect of spring 59, when it is engaged.

A tab 72 on the second control sleeve 65 facilitates the shifting of that control sleeve counterclockwise to disengage the inhibiting spring 59 and to allow the control sleeve 49 to return to its normal clockwise position under the bias of spring 51.

The incorporation of the inhibiting spring 59 with its control sleeve 65 in an automatic shifting bidirectional spring clutch provides an additional element of selective control to permit other desired actions of the apparatus involved to take place before the automatic shifting of the engagement of the pair of springs takes effect.

It is apparent that the inhibiting spring and its control sleeve of the invention can be used on an unidirectional spring clutch. Likewise, it is apparent that instead of a single control sleeve for both the drive springs 39, 40, an individual sleeve for each drive spring with individual bias can be used and the additional control of an individual inhibiting spring and its control sleeve applied to each drive spring.

In the illustrated apparatus in which the preferred embodiment of the invention may be utilized, a crank 73 is fixed to a shaft 75 journalled in the sleeve 23 by means of bearings 76. The crank 73 is part of a mechanism for pivoting the forward mail gate 13 upwardly and for shifting the control sleeves 49, 65.

The gate 13 is fixed to the shaft 75 by a horizontal bar 80 extending forwardly from the shaft and, upon the clockwise rotation of the crank 73, is pivoted upwardly. An arm 74 is fixed to the rearward end of the shaft 75 and has an elongated pin 78 mounted on its outward end. The pin 78 extends forwardly and the arm 74 and pin 78 are so positioned as to interact with the tab 72 of the control sleeve 65 and to hold the inhibit spring 59 out of engagement with the shifter sleeve 49 when mail gate 13 is closed.

Thus, when gate 13 is closed, the sleeve 65 is held in its counterclockwise position and the left-hand wound inhibiting spring 59 is disengaged and ineffective. However, as the crank 73 begins to turn clockwise to raise the gate 13, the pin 78 is pulled away from the tab 72 releasing the inhibiting spring 59 to its normal coiling action which brakes any clockwise shift of the sleeve 49. The inhibiting spring 59 remains engaged until the gate 13 is returned to its fully closed position, the arm 74 once more impressing the pin 78 against the tab 72.

The crank 73 has a short arm 81 fixed to the shaft 75 and a longer arm 83 substantially orthogonal to the short arm. When the gate 13 is closed, the arm 81 is substantially horizontal with the arm 83 depending therefrom. An elongated slot 85 in the arm 83 has captured therein a stud 87 mounted on the longer arm 88 of a bell crank 89 for driving the crank 73.

The bell crank 89 is pivoted on a shaft 91 journalled in the housing 17 and is mechanically oscillated to turn the crank 73 and thereby the shaft 75 by means that will be explained hereinafter.

Figure 4:
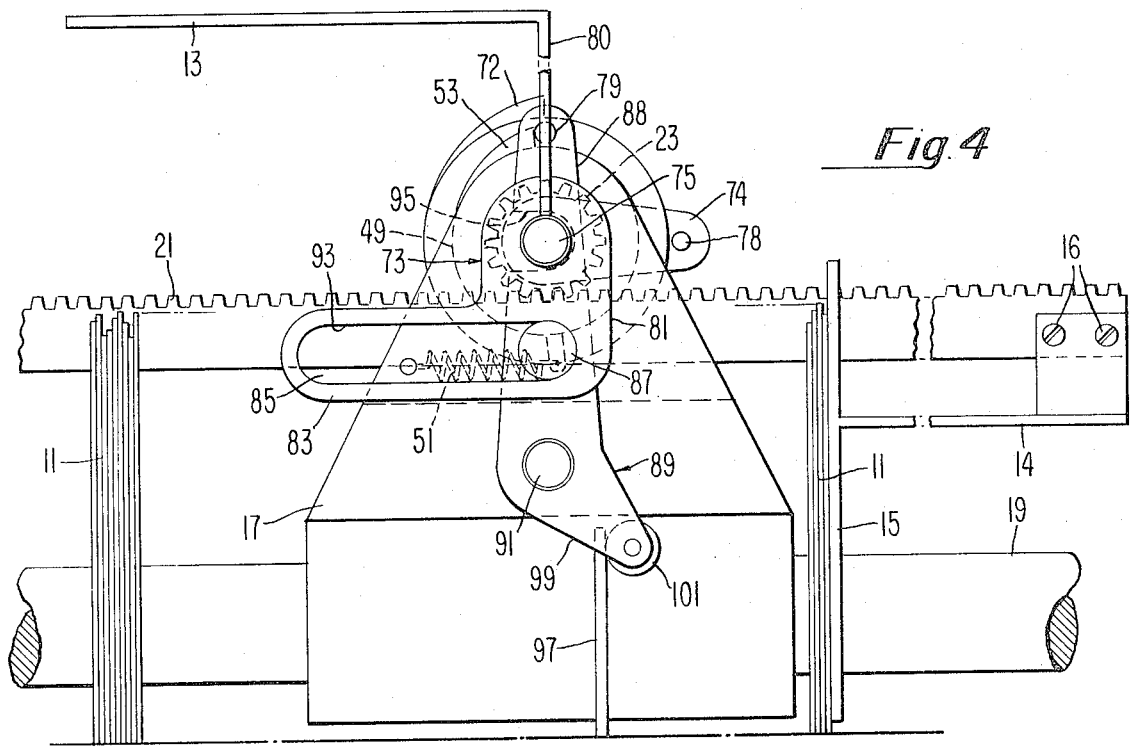
FIG. 4 is an end view of the apparatus of FIG. 1 with the controls in the reverse mode.

The longer arm 88 of the bell crank 89 is substantially horizontal when the gate 13 is closed and the stud 87 rides in the bottom of the slot 85. If the bell crank 89 is rotated counterclockwise about the pivot 91, the stud 87 exerts a force against the inner surface 93 of the slot 85 turning the crank 73 clockwise. As the bell crank 89 continues to turn counterclockwise, the stud 87 advances along the surface 93 rotating the crank 73 substantially 90° and terminating against the inner end of the slot 85, as seen in FIG. 4. In this state of the apparatus the slotted arm 83 of the crank 73 is substantially horizontal and the gate 13 has been rotated upwardly to allow ejection of the mail 11.

In the preferred embodiment of the linear to linear motion apparatus of the invention, utilizing the slotted crank 73 and the bell crank 89, any torque developing on the shaft 75, due to pressure of mail against the closed forward gate 13, cannot rotate the crank 73 clockwise. Likewise, when the gate 13 is raised, the gravitational force of the weight of the gate cannot rotate the crank 73 counterclockwise. In each case, there is no moment arm to rotate the bell crank 89, as required.

Therefore, due to the preferred arrangement, the gate 13 is in a stable position both when closed and when open. However, if such stable positions for gate 13 are not required, the slotted crank 73 and the bell crank 89 can be replaced by meshed counterrotating gears.

A pin 79 is mounted toward the outer end of the longer arm 88 of the bell crank 89 and is positioned to engage the tab 53 of the control sleeve 49 and shift the sleeve 49 counterclockwise against the bias of spring 51 as the crank 73 completes its 90° of clockwise rotation under the impetus of the bell crank 89. The pin 79 maintains the sleeve 49 in its counterclockwise position engaging the drive spring 39 and disengaging the drive spring 40 as long as the gate 13 is fully open.

When the gate 13 starts to close, the pin 79 starts to withdraw from the tab 53 tending to release it to the bias of spring 51. However, the helical spring 59 is now engaged and inhibits the biased clockwise shift of the control sleeve 49. Only when the gate 13 is completely closed and the pin 78 shifts the inhibit control sleeve 65 counterclockwise, disengaging the inhibit spring 59, is the control sleeve 49 allowed to return to its clockwise position under the bias of spring 51.

A notch 95 may be cut out of the arm 88 of the bell crank 89 so as to engage and seat against the shaft 75 as the bell crank completes its counterclockwise rotation.

A stop 97 (FIG. 4) is positioned in the path of the short arm 99 of the bell crank 89 near the point for opening the gate 13 and ejecting the mail 11. As the housing 17 is advanced along the shaft 19, a roller 101 mounted near the end of the short arm 99 engages the stop 97 and the continued advance of the housing 17 impresses the roller against the stop rotating the bell crank 89 counterclockwise about the pivot 91.

Similarly, a stop 103 (FIG. 1) is positioned to engage the other side of the roller 101, as the housing is moved rightwardly to its original position, for camming the bell crank 89 clockwise back to its original position. With the clockwise rotation of the bell crank 89 the stud 87 interacts with the slot 85 to rotate the crank 73 back to its original position and close the gate 13.

In the operation of the illustrated embodiment of the invention in mail apparatus, mail starts to accumulate between the forward gate 13 and the backing plate 15 when the housing 17 with the gate attached thereto is in a rearward position along the shaft 19 and the rack 21.

The bell crank 89 has been rotated clockwise, releasing the control sleeve to the bias of spring 51 and disengaging the inhibit spring 59. The drive spring 39 is disengaged and the drive spring 40 engaged. The drive sleeve 23 is, therefore, free to "overrun" counterclockwise.

As mail accumulates between the forward gate 13 and the backing plate 15 pressure develops against the gate 13 and the housing 17 is allowed to move linearly along the shaft 19 as the rack 21 turns the drive sleeve 23 idly counterclockwise. When a "batch" of mail is accumulated between the gate 13 and the backing plate 15, pressure is applied to the rear end of the rack 21 tending to run the rack through the housing 17 and turn the drive sleeve 23 clockwise. The engaged spring 40 brakes such action and the housing 17 is moved linearly along with the rack 21 advancing the batch of mail along the shaft 19 to the appointed transfer position.

When the roller 101 engages the stop 97 the bell crank 89 is activated, turning the crank 73 clockwise, raising the gate 13, first engaging the inhibiting spring 59 through the release of the inhibiting control sleeve 65, and later shifting the control sleeve 49 against bias as the gate 13 becomes completely open.

With the reversed application of the drive springs 39, 40, the drive sleeve 23 is free to overrun clockwise, the housing 17 is released from the rack 21 for forward motion of the rack, and the rack runs linearly through the housing, advancing the backing plate 15 sufficiently to eject the mail 11.

The rack 21 is then retracted linearly tending to turn the drive sleeve 23 counterclockwise. The engaged drive spring 39 brakes the drive sleeve 23 and the housing 17 is drawn back linearly with the rack 21.

As the rack 21 and housing 17 are retracted, the roller 101 engages the stop 103, rotating the bell crank 89 clockwise and the crank 73 counterclockwise immediately removing the pin 79 from the latch 53 of the control sleeve 49. However, the engagement of the inhibit spring 59 prevents the bias on the control sleeve 49 from switching the engagement of the drive springs 39, 40. The rack 21 and the housing 17 are further retracted linearly along the rack 21 to the original position of the housing.

As the housing 17 is returned to its original position, the rotations of the bell crank 89 and crank 73 are completed, shifting the inhibit control sleeve 65 counterclockwise through the interaction of the pin 78 on the tab 72, releasing the control sleeve 49 to its bias and thereby shifting the engagement of the control spring 39, 40 back to their original state.

In the preferred embodiment it is only necessary, in the ejection of the mail, to advance the backing plate 15 to substantially its original position relative to the housing 17 and the forward gate 13. The rack 21 and backing plate 15 will advance slightly with respect to the housing 17 as the shaft 75 is rotated, opening the gate 13. However, this change in the relative positions of the housing 17 and backing plate 15 will be exactly compensated for as the gate 13 is being closed in the retraction of the housing.

In the preferred embodiment, therefore, the housing 17 and rack 21 may be retracted together and, upon the closing of gate 13, the various elements of the apparatus will be in their original positions.

If it is necessary, however, to run the rack 21 and backing plate 15 somewhat farther forward, in the ejection of the mail, than their original position relative to the housing 17, the rack 21 can be retracted farther to its original position, after the gate 13 is closed and the inhibit spring 59 released, idly turning the drive sleeve 23 counterclockwise.

The clutch of the invention, although simple in construction and operation, permits a housing to move unidirectionally in either direction, with respect to a drive rack, or the drive rack to move unidirectionally, in either direction, through the housing, or the housing to be locked to the drive rack for movement unidirectionally, in either direction with the rack, with a minimum of controls, the inhibit spring and its control giving maximum flexibility as to staying the effect of automatic shifting of the drive springs.

Additionally, the inhibit spring and its control sleeve can perform a memory function in the clutch in that the state of the clutch is maintained, despite the functioning of automatic shift apparatus, until it is desired to release the clutch to the automatic function.

What is claimed is:

1. A linear to linear motion apparatus comprising:
   a housing mounted for free linear movement in either direction;
   a drive member rotatably journalled in said housing, the axis of rotation being orthogonal to said linear movement;
   an elongated toothed member slidably mounted in said housing and orthogonally geared to said drive member; and
   means for controlling the rotation in either direction and non-rotation of said drive member with respect to said housing.

2. The linear to linear motion apparatus of claim 1 wherein said controlling means is a bidirectional clutch.

3. The linear to linear motion apparatus of claim 2 wherein said bidirectional clutch includes a pair of helical springs coiled on respective adjoining surfaces of said drive member and said housing.

4. The linear to linear motion apparatus of claim 1 wherein said drive member and said housing have a plurality of abutting surfaces of circular cross section and wherein said controlling means includes a pair of helical springs coiled on respective ones of said abutting surfaces in opposed relationship.

5. The linear to linear motion apparatus of claim 4 wherein said controlling means also includes reciprocable means slidably mounted on said housing and wherein said pair of springs are like wound and oppositely coiled on said respective abutting surfaces with one end of each of said springs being captured in said reciprocable means for engaging one spring and disengaging the other spring by the shifting of said reciprocable means.

6. The linear to linear motion apparatus of claim 5 wherein said reciprocable means is a control sleeve journalled on the surfaces of said housing, said sleeve having short slots therein for receiving said captured ends and wherein the other ends of said springs are imbedded in said housing.

7. The linear to linear motion apparatus of claim 6 wherein said control sleeve is biased for engagement of one of said springs and disengagement of the other and wherein said controlling means also includes means for shifting said control sleeve against bias.

8. The linear to linear motion apparatus of claim 7 wherein said control sleeve and said housing also having abutting surfaces of circular cross section and wherein said controlling means also includes a third helical spring coiled on said abutting surfaces of said sleeve and said housing for inhibiting the return of said control sleeve under bias from its shifted position when said third helical spring is engaged.

9. The linear to linear apparatus of claim 8 wherein said controlling means also includes means for normally holding said third spring disengaged and said controlling of means further includes means for releasing said holding means.

10. The linear to linear apparatus of claim 9 also including means for limiting the excursion of said housing in each direction and wherein said controlling means also includes means interacting with said limiting means at one end of said excursion for automatically first actuating said releasing means and then activating said shifting means and for interacting with said limiting means at the other end of said excursion for first deactivating said shifting means and then reactivating said holding means.

* * * * *